United States Patent [19]

Kölbl et al.

[11] 4,235,351

[45] Nov. 25, 1980

[54] MERCHANDISE DISPENSING DEVICE FOR A VENDING MACHINE

[75] Inventors: Richard Kölbl, Herrieden; Bernd Mehlan, Petersaurach; Josef Gress, Bechhofen; Frank Dörrbeck; Rudolf Leichs, both of Herrieden, all of Fed. Rep. of Germany

[73] Assignee: Sielaff GmbH & Co. Automatenbau Herrieden, Herrieden, Fed. Rep. of Germany

[21] Appl. No.: 919,748

[22] Filed: Jun. 27, 1978

[30] Foreign Application Priority Data

Jul. 28, 1977 [DE] Fed. Rep. of Germany ....... 2733968

[51] Int. Cl.³ ............................................. B65G 59/06

[52] U.S. Cl. ....................................... 221/92; 221/301

[58] Field of Search ................. 221/289, 92, 301, 299, 221/300, 290, 298

[56] References Cited

U.S. PATENT DOCUMENTS

| | | | |
|---|---|---|---|
| 309,103 | 12/1884 | Schofield | 221/301 |
| 1,619,006 | 3/1927 | Vaughan . | |
| 1,700,697 | 1/1929 | Draper | 221/301 X |
| 1,794,424 | 3/1931 | Smith et al. | 221/301 X |
| 2,380,194 | 7/1945 | Sharp | 221/301 X |
| 2,727,654 | 12/1955 | Childers | 221/22 |
| 3,276,624 | 10/1966 | Payne | 221/299 X |
| 3,743,137 | 7/1973 | Bennett | 221/289 |

*Primary Examiner*—Allen N. Knowles
*Attorney, Agent, or Firm*—Haseltine, Lake & Waters

[57] ABSTRACT

The present invention discloses a merchandise dispensing device for a vending machine. The device comprises a dispensing part, with a dispensing compartment floor, capable of pivoting from an intake position to a dispensing position. In the dispensing position, the merchandise, capable of rolling, especially bottles or tins, stored in inclined compartments prop by a support arch. A roll-on surface is provided in between the support arch and the dispensing compartment floor, to facilitate a rolling of the merchandise in the intake position, in which the dispensing compartment floor forms an obtuse angle with the roll-on surface and the dispensing compartment floor is wider than the roll-on surface.

2 Claims, 4 Drawing Figures

MERCHANDISE DISPENSING DEVICE FOR A VENDING MACHINE

Figure 1:
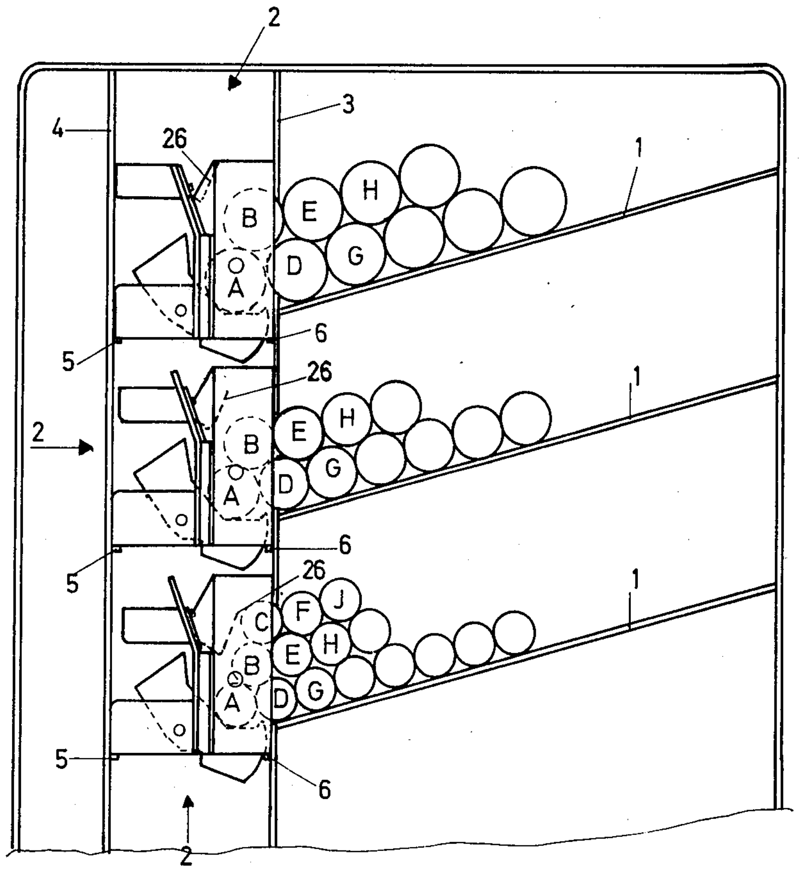

The invention relates to a merchandise dispensing device for a vending machine for merchandise capable of rolling, especially bottles or tins, which are stored on inclined compartments, whereby the mechandise dispensing device has a dispensing part, with a dispensing compartment floor, capable of pivoting from an intake position to a dispensing position, and which in the dispensing position props by means of a support arch the merchandise lined up in a compartment and in which is provided between the support arch and the dispensing compartment floor a roll-on surface, onto which merchandise rolls in the intake position.

A vending machine of this type is described in U.S. Pat. No. 2,513,595. The dispensing part in that case is in the form of a cylindrical drum, which exhibits in its radial circumference clearance exactly matched to the size of the merchandise. The rotating angle between intake position and dispensing position amounts to approximately 90° because the compartments are disposed very steeply. In the event of a flatter arrangement of the compartments, the pivot angle would be correspondingly greater. It is a disadvantage that different sizes of merchandise can only be dispensed if drums with corresponding extraction are available.

In German Patent Application laid open for public inspection No. 19 26 634 a dispensing part is described, which travels through an angle of approximately 180° between its intake position and its dispensing position. To match the depth of the clearance, for receiving the mechandise, to the respective package size intermediate floors are recommended.

Moreover a pivoting dispensing gripper device is shown, in German Patent Application laid open for public inspection No. 18 08 785, which is adapted for a determined diameter of merchandise and which feeds the merchandise onto an additional dispensing surface. The gripper device thereby describes an angle of approximately 180°.

Furthermore revolving dispensing elements are known from German Patent Application published for opposition No. 12 66 038 and German Patent Application laid open for public inspection No. 21 39 955. The surface design is always adapted to a determined diameter of merchandise.

Furthermore it is already known for merchandise capable of rolling to be dispensed from inclined compratments by means of hoists and from vertical compartments by means of balances.

The purpose of the present invention is to design a merchandise dispensing device of the first described type, such that merchandise capable of rolling and with different diameters can be dispensed with a small rotating movement of the dispensing part.

In accordance with the invention the above-mentioned problem is solved in that the dispensing compartment floor forms an obtuse angle to the roll-on surface and the dispensing compartment floor is wider than the roll-on surface. Thus it is possible, to dispense merchandise of different diameters. In this connection bottles of a diameter between approximately 5 cm and approximately 9 cm are especially considered. The respective bottle lies in the intake position under pressure of the following bottles in the obtuse angle. In the dispensing position the bottle is released from the roll-on surface and can easily be withdrawn.

Because of the design of the dispensing part in accordance with the invention a smaller, less than 90°, pivoting angle between intake position and dispensing position is sufficient. In addition, the dispensing device is compactly constructed.

With the dispensing device, merchandise capable of rolling can also be dispensed, when the merchandise lies in several layers one above the other in the allocated inclined compartment. Preferably for this there is provision for a guide plate, which extends at an acute angle to the inclined compartment and is mounted above the roll-on surface situated in the intake position. This guide plate is so disposed, that on the one hand it supports the leading merchandise of the upper row and on the other hand guides the merchandise to the roll-on surface.

Preferably the guide plate is adustable on an angled rail so that it can be adjusted on the rail according to the diameter of the bottles to be dispensed.

In both positions of the dispensing part the improper removal of a bottle directly from the inclined compartment is prevented. In the intake position the dispensing compartment floor prevents the merchandise from being touched. In the dispensing position improper removal of merchandise will be prevented by the roll-on surface and the lower edge of the guide plate.

Preferably a part of the surface on the side of the dispensing compartment floor opposite the roll-on surface is bent upwardly. On the one hand this part of the surface improves the closing of the compartment in the intake position and on the other hand this part of the surface constitutes with the dispensing compartment floor in the dispensing position a certain centering for the merchandise to be dispensed.

Figure 2:
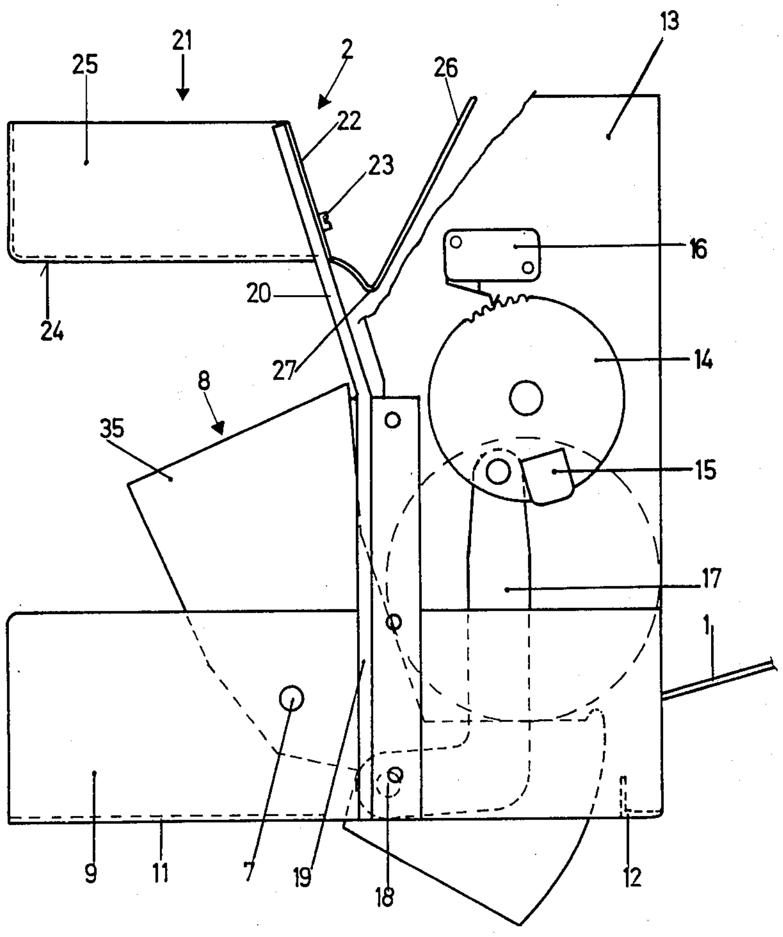
Figure 3:
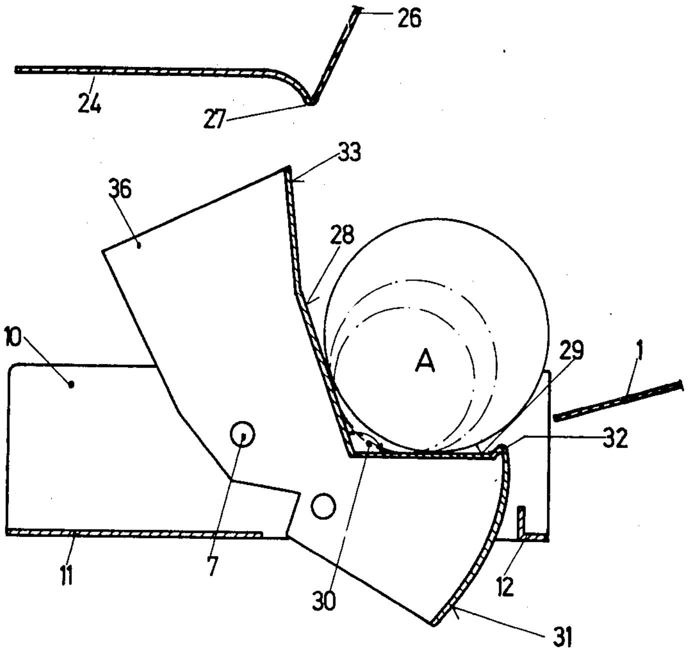
Figure 4:
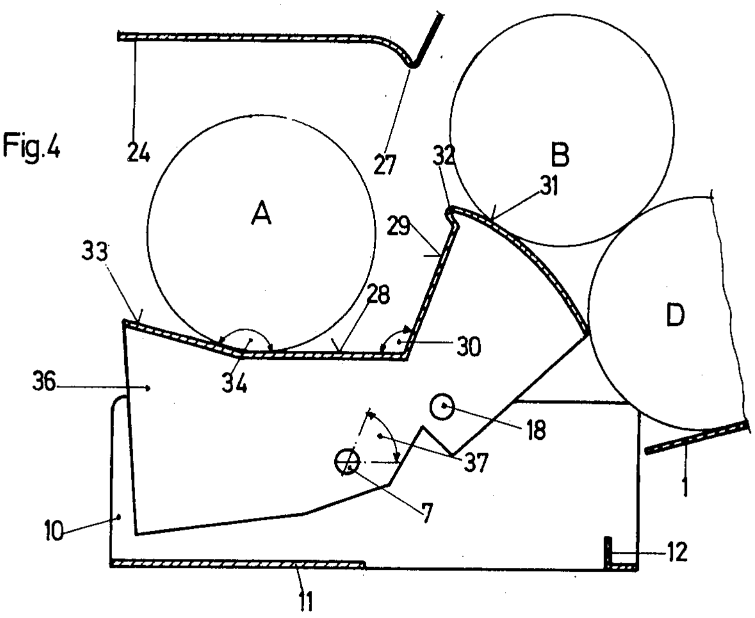

The invention will now be described by way of example with reference to the accompanying drawings, in which:

FIG. 1 shows a front view of an embodiment of a vending machine according to the invention with the door open, FIG. 2 shows an embodiment of a dispensing device according to the invention, shown enlarged in comparison with FIG. 1, FIG. 3 shows the dispensing device of FIG. 2 in the intake position and FIG. 4 shows the dispensing device in the dispensing position.

Referring to the drawings, a vending machine is provided with inclined compartments 1. At the lower end of each compartment a dispensing device 2 is provided. Each dispensing device 2 is constructed as an assembled unit, to be inserted between supports 3 and 4 on rails 5 and 6. In the area of each dispensing device 2 in the door, not shown in detail, a flap is provided for removal of the merchandise from the dispensing device.

The dispensing device 2 has a pivotable dispensing part 8 on an axle 7. The axle 7 is mounted on a front wall 9 and on a back wall 10. The front wall 9 and the back wall 10 are on the one side connected to a floor plate and on the other side with a rail 12.

On the front wall 9 there is fixed a support plate 13, on which a cog-wheel 14 with a trip cam 15 is mounted. The trip cam 15 serves to actuate a limit switch 16. To cog-wheel 14 one end of an eccentric lever 17 is coupled, whose other end is coupled to a fulcrum 18 on the dispensing part 8. The cog-wheel 14 is arranged to be driven by an electric motor through a pinion, not illustrated in detail.

Outside front wall 9 and the back wall 10 respectively, a guide strip 19 is fixed, which in its upper segment 20 is angled. On to the angled segment 20 an upper part 21 is bolted. Here in an angle piece 22 there is a slot, through which a bolt 23 is screwed into a threaded hole in the angled segment 20. The upper part 21 is thus capable of being adjusted for height in a line parallel to the angled segment 20.

The upper part 21 constitutes a cover 24 and a side wall 25. The cover 24 continues in a guide plate 26, whose lower edge 27 forms a barrier flange. The guide plate 26 lies at an acute angle to compartment 1.

In dispensing part 8 a dispensing compartment floor 28 and a roll-on surface 29 is provided. The dispensing compartment floor 28 and the roll-on surface 29 form an obtuse angle 30, which in the design example amounts to 120°. A support arch 31 is joined to the roll-on surface 29. Between the roll-on surface 29 and the support arch 31 a bead 32 is formed. The support arch 31 lies in an arc round axle 7. On the side opposite to the roll-on surface 29 a surface part 33 is bent upwardly and forms with the dispensing compartment floor 28 an obtuse angle 34, of approximately 165°. Side plates 35 and 36 stiffen the dispensing part 8 and are provided with holes for mounting on axle 7.

The manner of operating of the above-described merchandise dispensing device is in essence as follows:

In the intake position of the dispensing part 8, shown in FIG. 3, a bottle A lies, under pressure of the other bottles, in the angle 30. In its upper limit, it is arranged that in the intake position the bottle A shall not roll on the dispensing compartment floor. Its lower limit is so arranged that the rotation angle 37 from the intake position to the dispensing position should be as small as possible. In practice the angle 30 lies between 110° and 130°. The pivoting angle 37 lies thus between 50° and 70°.

The width of the roll-on surface 29 is so dimensioned, that the movement path of the bead 32 between bottles A and D is medium-sized (compare FIG. 1, middle compartment). The axle 7 is so placed, that bottles B, C are displaced as little as possible by the pivoting movement of the dispensing part 8.

Should the dispensing part 8 in the intake position (compare FIG. 3) be brought into the dispensing position (compare FIG. 4), then here the bottle A lying on the roll-on surface 29 will be lifted in an arc. Bottles B, C (compare FIG. 1) will thereby be little displaced. The guide plate 26 ensures that the bottles B, C do not jam or tilt.

In the dispensing position, bottle A is released from the roll-on surface 29. In the slightly inclined position of the dispensing compartment floor the bottle rests in the obtuse angle 34. The side plates 35 and 36 strike against the floor plate 11. The support arch 31 holds merchandise B and D. The bead 32 aids the separation of the individual bottles.

In the following dispensing movements the bottles will be dispensed in the alphabetical order shown in FIG. 1.

In FIG. 1, upper compartment, and in FIGS. 3 and 4 the diameter of the large bottles is shown. In the middle and bottom compartment (compare FIG. 1) smaller bottle diameters are shown respectively. For the conversion of the dispensing device to different bottle diameters only the upper part 21 needs to be displaced. In the case of smaller bottles for example the upper part is moved downwards. Thus, in the first place, the guide plate 26 is moved down to a position for dispensing the smaller bottle diameters; in the second plate, the space under the cover 24 corresponding to the smaller bottle diameters becomes lower; and thirdly the barrier flange 27 is moved downwards. Thus, in the dispensing position the distance between the bead 32 and the barrier flange 27 is so small, that no bottles can pass between them.

In the intake position improper removal of merchandise is also impossible, since the dispensing compartment floor 28 and the part surface 33 bars access to the bottles.

Altogether the dispensing device described makes possible good utilization of the space available in a vending machine, whereby when smaller bottles are to be dispensed more tiers can be stored in the respective compartment.

Within the scope of the invention are numerous alternative configurations. For example, it is possible to round off the obtuse angles 30 and 34.

What we claim is:

1. A merchandise dispensing device for a vending machine having inclined compartments in which the merchandise of different diameter capable of rolling are stored, comprising: a dispensing part with a dispensing compartment floor, capable of pivoting on an axle from an intake position to a dispensing position; a support arch around the axle to facilitate a prop of the merchandise in the dispensing position; a guide plate adjustably mounted on an angled segment of a guide strip and at an acute angle to said inclined compartment and a lower edge of said guide plate forming a barrier flange being adjustable in height for preventing a jamming of the merchandise; a roll-on surface between the support arch and the dispensing compartment floor forming an obtuse angle with the dispensing compartment floor on to which the merchandise rolls in the intake position; and a surface part is being bent upwardly on a side of the dispensing compartment floor opposite to the roll-on surface.

2. The merchandise device as recited in claim 1 in which the device is constructed as a slide-in unit.

* * * * *